United States Patent [19]

Sasaki et al.

[11] 3,917,660

[45] Nov. 4, 1975

[54] PROCESS FOR PREPARING ω-NITROCARBOXYLATE

[75] Inventors: Hiroo Sasaki; Hisao Takemoto; Kazuo Tago, all of Shin Nanyo, Japan

[73] Assignee: Toyo Soda Manufacturing Co., Ltd., Japan

[22] Filed: June 13, 1973

[21] Appl. No.: 369,598

[30] Foreign Application Priority Data

June 16, 1972 Japan.............................. 47-60247

[52] U.S. Cl.............................. 260/404; 260/586 R
[51] Int. Cl............................................ C08h 17/36
[58] Field of Search....................... 260/404, 533 C

[56] References Cited
UNITED STATES PATENTS

| | | | |
|---|---|---|---|
| 3,772,358 | 11/1973 | Lang.................................... | 260/404 |
| 3,796,734 | 3/1974 | Duranleau et al. ................. | 260/404 |

FOREIGN PATENTS OR APPLICATIONS 807,193    2/1969   Canada............................ 260/404

OTHER PUBLICATIONS

Matlack et al., Journal Org. Chem., Vol. 32, 1995–1996.
Feuer et al., Journ. Org. Chem., Vol. 31, 3152–3158.

*Primary Examiner*—Lewis Gotts
*Assistant Examiner*—Ethel G. Love
*Attorney, Agent, or Firm*—Oblon, Fisher, Spivak, McClelland & Maier

[57] ABSTRACT

ω-Nitrocarboxylate salts are prepared by nitrooxidation of a cycloalkene, cycloalkadiene or a cycloalkatriene, with a mixture of oxygen and nitrogen dioxide. The reaction product is extracted with an alkaline solution to obtain the alkali salt of α-nitrocycloalkanone, α-nitrocycloalkenone or α-nitrocycloalkadienone which is converted to the corresponding ω-nitrocarboxylate salt.

8 Claims, No Drawings

3,917,660

PROCESS FOR PREPARING ω-NITROCARBOXYLATE

BACKGROUND OF THE INVENTION

1. Field of the Invention

This invention relates to a process for preparing ω-nitrocarboxylate salts such as sodium ω-nitrododecanoate. More particularly, this invention relates to a process for prearing ω-nitrocarboxylate salts from a nitrooxidation reaction mixture in which a cycloalkene compound is reacted with nitrogen dioxide and oxygen in the presence of a catalyst.

2. Description of the Prior Art

The nitrooxidation of cycloalkenes has been effectively conducted in inert solvents of low polarity. The nitrooxidation reaction mixtures of the past have contained cycloalkene compounds such as cyclododecene, cyclododecadiene or cyclododecatriene as the starting materials and the main product of the reaction has been α-nitrocycloalkanone compounds, such as α-nitrocyclododecanone, α-nitrocyclododecenone or α-nitrocyclododecadienone. Catalysts such as dimethylsulfoxide and dimethylformamide have been used in the reaction. By-products of the reaction included nitric acid, coloring materials and unreacted cycloalkene starting materials.

ω-Nitrocarboxylate salts which are the eventual products of the nitrooxidation reaction are used for the preparation of nylon. Because of purity requirements, it is very important that the ω-nitrocarboxylate salts used for this purpose be quite pure.

In the past, the nitrooxidation reaction mixture of the cycloalkenes contained impurities which were relatively difficult to separate from the main nitrocycloalkanone product.

A need, therefore, exists for a method of producing ω-nitrocarboxylates which are free of impurities and are suitable for use in the synthesis of synthetic materials.

SUMMARY OF THE INVENTION

Accordingly, one object of this invention is to provide a process for preparing ω-nitrocarboxylate salts from the nitrooxidation reaction mixture of cycloalkene compounds such as cycloalkenes, cycloalkadienes and cycloalkatrienes.

Briefly, this object and other objects of this invention as hereinafter will become readily apparent can be attained by washing the nitrooxidation reaction mixture and removing the cycloalkene compounds with an alkaline solution containing from 0.1 to 5 mole % alkali, extracting the main nitrocycloalkanone product such as nitrocycloalkanone, nitrocycloalkenone or nitrocycloalkadienone from the resulting reaction mixture in the form of an ω-nitrocarboxylate and/or the alkali salt of an α-nitrocycloalkanone product such as α-nitrocycloalkanone, α-nitrocycloalkenone, α-nitrocycloalkadienone with an aqueous alkaline solution, and then converting the remaining alkali salt of the α-nitrocycloalkanone compound to the ω-nitrocarboxylate.

DESCRIPTION OF THE PREFERRED EMBODIMENTS

In the nitrooxidation process of this invention it is preferable to use reaction mixtures of $C_{6-12}$ cycloalkenes, cycloalkadienes or cycloalkatrienes, which hereinafter will simply be referred to as a cycloalkene compound. The main product of the nitrooxidation reaction mixture includes α-nitrocyclalkanones such as 2-nitrocyclododecanone, 2-nitrocyclooactanone, and 2-nitrocyclohexanone; α-nitrocycloalkenones such as 2-nitro-5-cyclododecenone and 2-nitro-9-cyclododecenone; and α-nitrocycloalkadienones such as 2-nitro-5,9-cyclododecadienone. (Hereinafter, the product compounds collectively or individually will simply be referred to as a nitrocycloalkanone compound.)

The nitrooxidation of cycloalkene compounds is conducted by reacting a cycloalkene compound with nitrogen dioxide and oxygen in the presence of a catalyst such as dimethyl sulfoxide, dimethylformamide, or the like, and an inert solvent such as an aromatic or aliphatic hydrocarbon such as toluene and the like, or a halogen containing hydrocarbon. Prior to the extraction of the main nitrocycloalkanone product from the reaction solution, it is necessary to remove impurities from the reaction mixture.

The method of purification of the reaction mixture of this invention involves the removal of the catalyst and nitric acid and also the removal of the special by-products which impart color to the reaction medium (coloring impurities). In order to remove the catalyst and nitric acid from the reaction product, the reaction mixture may be washed with small amounts of water. The catalyst is separated by the washing procedure and can be recovered by any conventional method, and repeatedly used. The coloring impurities of the reaction mixture are very reactive with alkali so that they can be easily removed by contacting the reaction medium with an aqueous alkaline solution containing an equivalent or slight excess of alkali. The amount of alkali is preferably in the range of 0.1 – 5 mole % based on the nitrocycloalkanone product.

The coloring impurities are usually present in quantities of less than 1 mole % based on the nitrocycloalkanone product. Thus, no advantages are to be gained by using excessive amounts of alkali, particularly when losses of nitrocycloalkanone product result. The amount of alkali used can be decreased by using strong alkali materials in the purification processes. The purification process for the removal of the coloring impurities can be conducted at 0° – 130°C, preferably 20° – 100°C. The time required for the purification is dependent upon the type of alkali and the temperature. When the reaction medium is purified at 40° – 80°C with NaOH, it is sufficient to treat the reaction medium for 15 min. to 1 hour.

Preferably, the aqueous alkaline solution can be added to the nitrooxidation reaction product without washing the solution with water. Nitric acid can be easily converted to a nitrate salt and is removed together with the coloring impurity. When ammonia is added to the nitrooxidation reaction mixture without the presence of water, the neutralized coloring impurity is precipitated together with ammonium nitrate, because the ammonium nitrate is sparingly soluble in the organic solvent of the reaction mixture. Suitable alkalies include sodium hydroxide, sodium carbonate, sodium bicarbonate, potassium hydroxide, ammonia and any other alkaline compounds.

When the reaction medium is pretreated with an alkaline solution as described, the coloring impurities (special by-products), the catalyst and the nitric acid can be removed thereby eliminating the possibility of contamination of the extracted solution and as the result, the nitrocycloalkanone product can be obtained with a high degree of purity. The purified nitrooxidation reaction mixture contains the main nitrocycloalkanone product together with the inert solvent, unreacted cycloalkene starting compound and the nitrated by-products such as 2-nitrocycloalkanol and 2-nitrocycloalkylnitrate.

In the extraction of the nitrocycloalkanone product, when the purified reaction mixture is contacted with the alkaline solution, the nitrocycloalkanone product is converted to the alkali salt at relatively low temperatures with the dilute alkaline solution. The nitrocycloalkanone products such as nitrocyclododecanone can be converted to the alkali salt of an ω-nitrocarboxylate such as sodium ω-nitrododecanoate, which in turn can be converted to an ω-nitrocarboxylic acid such as ω-nitrododecanoic acid. The alkaline solution used for the extraction of the purified reaction medium can contain alkalis such as alkali metal hydroxides, alkali metal carbonates and ammonia.

As stated above, the main nitrocycloalkanone product is extracted from the reaction medium in the form of an ω-nitrocarboxylate or the alkali salt of the nitrocycloalkanone product or mixtures thereof. The unreacted cycloalkene starting compound and other by-products which remain in the reaction medium after the initial purification step, are not extracted and remain in the organic solvent phase. It is possible to extract the product nitrocycloalkanone compound so as to obtain any desired ratio of the ω-nitrocarboxylate to the alkali salt of the nitrocycloalkanone compound. When the extracted aqueous solution is heated, the alkali salt of the nitrocycloalkanone compound is converted to the ω-nitrocarboxylate. The ratio of the ω-nitrocarboxylate to the alkali salt of the nitrocycloalkanone compound in the extract is dependent upon the type of alkali salt, the concentration of alkali, the extraction temperature and the extraction time. Under severe extraction conditions, the ratio of ω-nitrocarboxylate produced increases. In order to extract the product nitrocycloalkanone compound in the form of the ω-nitrocarboxylate salt, the extraction is usually conducted at a temperature from 0°–110°C, 60° – 110°C, or preferably 70° – 90°C. The amount of alkali used is usually in the range of a 1.0 – 3.0 mole ratio to the product nitrocycloalkanone compound. If the extraction temperature is greater than 110°C or if the alkali used is in excess of a 3.5 mole ratio to the nitrocycloalkanone compound, side reactions involving the nitro group result. The extraction period is dependent upon the extraction temperature and the amount of alkali used, and it usually lasts from 10 minutes to 5 hours. The extraction period is preferably shortened into the range required for the conversion of the alkali salt of the nitrocycloalkanone compound to the ω-nitrocarboxylate salts. Water is used in the extraction step to maintain a solution with an alkali concentration of from 0.05 – 3.0N.

When the extract contains the alkali salt of the product nitrocycloalkanone compound, conversion of the alkali salt of the nitrocycloalkanone to the ω-nitrocarboxylate is accomplished by cleavage of the cycloalkanone ring. The conditions for the conversion to the ω-nitrocarboxylate product are substantially the same as the conditions mentioned above for the direct formation of the ω-nitrocarboxylate. For example, when 2-nitrocyclododecanone is extracted with an aqueous 1N NaOH solution wherein the mole ratio of NaOH to 2-nitrocyclododecanone ranges from 1 to 1.1, the alkali salt of 2-nitrocyclododecanone can be selectively extracted at 30°C in less than 40 minutes, or at 50°C in less than 15 minutes. In this extraction technique, ring cleavage results after several minutes at 70°C to form sodium ω-nitrododecanoate. The aqueous solution of the alkali ω-nitrocarboxylate, for example, sodium ω-nitrododecanoate prepared by the process of this invention is neutralized with a mineral acid to form the free acid, i.e., ω-nitrododecanoic acid.

The ω-nitrocarboxylic acids such as ω-nitrododecanoic acid which are formed by neutralization of the aqueous alkaline solution can be converted by hydrogenating the acid in the presence of a hydrogenation catalyst to the corresponding ω-aminocarboxylic acid such as ω-aminododecanoic acid. The ω-aminocarboxylic acids are very useful as starting materials for polymers such as nylon.

Having generally described this invention, a further understanding can be obtained by reference to certain specific examples which are provided herein for purposes of illustration only and are not intended to be limiting unless otherwise specified.

In the following examples, the term "percentage" indicates percent by weight.

EXAMPLE 1

A 40.0 g amount of cyclododecene, 28.0 g of dimethylsulfoxide and 360 ml of toluene were added to a 500 cc glass reaction vessel which was cooled to 0°C. The contents of the vessel were stirred and 27.8 g of oxygen and 20.0 g of dinitrogen tetroxide were admitted together into the reaction mixture over a period of 4 hours. The mixture was then stirred for an additional 30 minutes to complete the reaction. Water soluble components were removed from the solution by washing the mixture with three 60 ml portions of water. A 36 ml quantity of 0.05N aqueous NaOH was charged to the mixture which was stirred for 30 minutes at 50°C. The water layer which had a dark red-brown color was removed and the organic layer was washed with two 40 ml portions of water. The organic layer was then analyzed by gas-liquid chromatography. A 44.1 g amount of 2-nitrocyclododecanone was obtained with a purity of 83.7% relative to all of its components except toluene and 91.3% relative to all of the products of the reaction. The resulting toluene solution and 200 ml of a 1N aqueous NaOH solution were charged into a 1l glass reaction vessel. The mixture was stirred for 20 minutes at 40°C. After agitation of the solution was stopped, the lower water layer was separated and cooled to 10°C with ice-water. The organic solution was analyzed and no 2-nitrocyclododecanone was detected. The extracted aqueous solution was neutralized to a pH of 5.5 with 1N aqueous HCl with vigorous stirring. The resulting precipitate was collected, washed and dried to give 44.5 g of white 2-nitrocyclododecanone mp 68° – 69°C. The infrared spectrum of this solid was superimposable on the spectrum of an authentic sample of 2-nitrocyclododecanone. The purity of the solid was 99.1%. An almost white ω-nitrododecanoic acid product was prepared from the 2-nitrocyclododecanone obtained by cleavage with an equimolar amount of an aqueous NaOH solution followed by acidification.

In a comparison experiment, the nitrooxidation mixture was worked up by a standard procedure described in the literature wherein after the water soluble components were removed in the same manner mentioned above, toluene was removed by distillation under reduced pressure and a residual solid was recrystallized from 400 ml of n-hexane to give 35.5 g of 2-nitrocyclododecanone having a slightly brown color (mp 65°–69°C). The 2-nitrocyclododecanone product had an impurity content of 2.8%. When the product was dissolved in 160 ml of a 1N aqueous NaOH solution to be converted into sodium ω-nitrododecanoate, the solution achieved a strong red-brown color. The ω-nitrododecanoic acid product eventually obtained from the 2-nitrocyclododecanone was brown.

EXAMPLE 2

The procedure of Example 1 was repeated in every detail from the nitrooxidation of cyclododecene through the removal of the water soluble components from the reaction mixture to the preextraction step. The resulting mixture and 194 ml of a 1N aqueous NaOH solution were charged to a 1l glass reaction vessel equipped with a stopcock on the bottom of the vessel through which the contents of the vessel could be removed. After stirring the mixture at 75°C for 10 minutes, the mixture was allowed to settle and the water layer was quickly removed into 200 g of ice-water.

The water layer was worked up by the same procedure described in Example 1 to give 40.7 g of a slightly yellow solid which was shown by careful analysis to contain 35.0 g of 2-nitrocyclododecanone and 5.5 g of ω-nitrododecanoic acid. The organic layer contained 4.1 g of 2-nitrocyclododecanone.

EXAMPLE 3

The procedure of Example 1 was repeated in every detail from the nitrooxidation of cyclododecene through the removal of the water soluble components in the resulting mixture to the preextraction step. The resulting mixture and 196 ml of 1N aqueous KOH solution were charged to a 1l glass vessel wherein the contents were stirred at 75°C for 2 hours. The mixture was allowed to settle and the water layer was separated and worked up in the same manner as described in Example 1 to give 47.8 g of slightly yellow ω-nitrododecanoic acid having a melting point of 53°–55°C. The infrared spectrum of this solid was superimposable on the spectrum of an authentic sample of ω-nitrododecanoic acid. A careful analysis of the product showed that the ω-nitrododecanoic acid contained 0.8% impurities. 2-Nitrocyclododecanone was not detected in the organic layer.

EXAMPLE 4

A 40.0 g amount of 1,5,9-cyclododecatriene, 12.0 g of dimethylsulfoxide and 360 ml of toluene were charged into a 500 cc glass reactor and cooled to 0°C. The contents were stirred and 8.3 g of oxygen and 6.0 g of dinitrogen tetraoxide were passed into the reaction mixture concurrently over a period of 1 hour and 20 minutes. The mixture was stirred for an additional 30 minutes. Upon completion of the reaction, the water soluble components were removed by washing with three 60 ml portions of water. A 48 ml quantity of 0.05N aqueous NaOH was added to the mixture which was stirred for one hour at 60°C. The red-brown water layer was removed and the organic layer was washed with two 40 ml portions of water. The organic layer contained 10.3 g of 2-nitro-5,9-cyclododecadienone which had a purity of 24.1% relative to all of the components except toluene and a purity of 78.6% relative to all of the products. The resulting toluene solution and 100 ml of a 0.5N aqueous NaOH solution were charged into a 1l glass vessel. The mixture was stirred for 30 minutes at 30°C. After agitation of the solution was stopped, the water layer was separated and cooled to 10°C. The organic layer did not contain 2-nitro-5,9-cyclododecadienone. As a consequence, 100 ml of benzene was added to the water solution which was neutralized with stirring to a pH of 5.5 with 0.5N aqueous HCl. The benzene solution was then washed with water and dried over anhydrous magnesium sulfate. The benzene was evaporated leaving 10.5 g of a pale yellow liquid which was shown by analysis to be 2-nitro-5,9-cyclododecadienone containing 1.9% impurities. The IR spectrum of the cyclododecadienone was superimposable on that of an authentic sample of 2-nitro-5,9-cyclododecadienone. From the liquid cyclododecadienone, pale yellow ω-nitro-4,8-dodecadienoic acid was prepared by the same procedure as described in Example 1.

In a comparison experiment, the solution from the nitrooxidation of 1,5,9-cyclododecatriene was worked up by a distillation procedure wherein after removal of the water soluble components in the same manner mentioned above, the mixture was dried over magnesium sulfate and the toluene and unreacted cyclododecatriene were evaporated at 70mm Hg and at 1mm Hg respectively leaving a residual oil from which only 5.3 g of product, b.p. 110°–150°C at 0.1 mm – 0.5 mm Hg was obtained by distillation. This liquid product contained 92.5% of 2-nitro-5,9-cyclododecadienone. During distillation of the liquid product, the distillation was often interrupted by decreases in pressure caused by decomposition of impurities contained therein.

EXAMPLE 5

The procedure of Example 4 was repeated in every detail from the nitrooxidation of cyclododecatriene through the removal of the water soluble components from the resulting mixture to the preextraction step. The mixture and 155 ml of a 0.3N aqueous NaOH solution were charged into a 1l glass vessel. The contents of the vessel were stirred for 2 hours at 80°C. The mixture was allowed to settle, and the water layer was separated and worked up in the same manner as described in Example 4 to give 11.5 g of a pale yellow oil. The IR spectrum of this liquid was superimposable on the spectrum of an authentic sample of ω-nitro-4,8-dodecadienoic acid. Analysis showed that this liquid contained 3.5% impurities. 2-Nitro-5,9-cyclododecadienone was not detected in the organic layer.

EXAMPLE 6

The procedure of Example 4 was repeated up to the point where the toluene solution was obtained containing crude 2-nitro-5,9-cyclododecadienone free from the water soluble components and the impurities which caused coloring of the solution. The mixture was stirred with 100 ml of water at 75°C, and 100 ml of a 2N aqueous ammonia solution was added to the mixture at the same temperature over a period of 1 hour. After stirring the solution for an additional 2 hours at 75°C, the mixture was cooled to room temperature. The precipitate which formed was filtered and dried to give 0.5g of ω-nitro-4,8-dodecadienoic amide. Then the water layer was removed and worked up by the same procedure as described in Example 4 to give 8.7 g of a pale yellow oil which contained 8.5 g of ω-nitro-4,8-dodecadienoic acid. The organic layer contained 1.4 g of 2-nitro-5,9- cyclododecadienone.

EXAMPLE 7

A 26.6 g amount of cyclooctene, 28.0 g of dimethylsulfoxide and 360 ml of toluene were charged into a 500 cc glass reactor, and the procedure of Example 1 was repeated until the water soluble components were removed by washing. Then 37 ml of a 0.1N aqueous KOH solution was added to the mixture which was stirred for 30 minutes at 50°C. After removal of the dark red-brown water layer, the toluene was washed with two 40 ml portions of water. The toluene contained 31.3 g of 2-nitrocyclooctanone with a purity of 80.9% relative to all of the components except toluene and a purity of 87.4% relative to all of the products. The mixture was mixed with 185ml of a 3N aqueous $Na_2CO_3$ solution and was stirred for 20 minutes at 40°C. Separation, acidification and benzene extraction of the mixture, as described in Example 4, resulted in the preparation of 30.1 g of a slightly yellow oil which contained 27.8 g of 2-nitrocyclooctanone and 1.3 g of the open-chain nitro acid. The organic layer contained 0.6 g of 2-nitrocyclooctanone.

EXAMPLE 8

A 19.8 g amount of cyclohexene, 28.0 g dimethylsulfoxide and 300 ml of carbon tetrachloride were charged into a 500 cc glass reactor and the procedure of Example 1 was repeated until the water soluble components were removed by washing the nitrooxidation reaction mixture. The mixture was stirred with 45 ml of a 0.1N aqueous ammonia solution for 45 minutes at 50°C. The carbon tetrachloride was removed and washed with two 40 ml portions of water. The carbon tetrachloride solution contained 21.3 g of 2-nitrocyclohexanone with a purity of 65.9% based on all of the components except carbon tetrachloride and a purity of 70.8% based on all of the products. The mixture of the carbon tetrachloride solution with 150 ml of a 2N aqueous $Na_2CO_3$ solution was stirred for 6 hours at 75°C. Then the mixture was worked up by the procedure described in Example 4 to give 23.8 g of a pale yellow oil which contained 18.9 g of ε-nitrocaproic acid and 4.0 g of 2-nitrocyclohexanone. The carbon tetrachloride contained 0.5 g of 2-nitrocyclohexanone.

EXAMPLE 9

The procedure of the nitrooxidation reaction of Example 1 was repeated with the following quantities of starting materials.

| | |
|---|---|
| 32.0 g | Cyclododecene |
| 5.5 g | Cyclododecadiene |
| 2.5 g | Cyclododecatriene |
| 28.0 g | Dimethylsulfoxide |
| 360 ml | Toluene |

A 19.5 g amount of oxygen and 14.0 g of dinitrogen tetroxide were charged over a period of 2 hours and 45 minutes and the mixture was stirred for an additional 30 minutes. A 2.2 g amount of anhydrous ammonia was passed into the mixture and the separated lower layer (35.0 g) consisting of dimethylsulfoxide and ammonium nitrate was recovered uncontaminated with water. The toluene layer was washed with two 40 ml portions of water and then mixed with stirring with 52 ml of a 0.05N aqueous NaOH solution for one hour at 60°C. The mixture was worked up as described in Example 1, to give a toluene solution containing a mixture of α-nitroketones consisting of 23.5 g of 2-nitrocyclododecanone, and 4.0 g of 2-nitrocyclododecanones (a mixture of 2-nitro-5-cyclododecenone, 2-nitro-9-cyclododecenone and 1.8 g of 2-nitro-5,9-cyclododecadienone). The total α-nitroketone content was 60.9% based on all of the components except toluene and 90.7% based on all of the products. The toluene solution was stirred with 130 ml of a 1N aqueous KOH solution for 1 hour and 30 minutes at 60°C. Then the aqueous layer was removed and worked up with 150 ml of benzene as the extraction solvent as described in Example 4, to give 29.1 g of a product mixture containing 8.8 g of ω-nitrododecanoic acid, 1.5 g of ω-nitrododecenoic acids (a mixture of ω-nitro-4-dodecenoic acid and ω-nitro-8-deodecenoic acid), 0.6 g of ω-nitro-4,8-dodecadienoic acid, 14.1 g of 2-nitrocyclododecanone, 2.4 g of a mixture of 2-nitrocyclododecenones and 1.1 g of 2-nitro-5,9-cyclododecadienone. The total percentage of these useful compounds was 97.9% based on the final product mixture. The toluene solution contained 1.2 g of 2-nitrocyclododecanone, 0.2 g of a mixture of 2-nitrocyclododecenones and 0.1 g of 2-nitro-5,9-cyclododecadienone.

EXAMPLE 10

Cyclododecene was converted to 2-nitrocyclododecanone according to the procedure of Example 1. The reaction mixture was worked up by recrystallizing the 2-nitrocyclododecanone product in n-hexane, as described in Example 1. 2-Nitrocyclododecanone which included an impurity content of 2.8% and which contained those impurities which causes a dark coloring of the solution when contacted with an alkaline solution was obtained. A 10.0 g amount of the crude 2-nitrocyclododecanone was dissolved in 100 ml of n-hexane at 50°C. To this solution was added 9 ml of a 0.05N aqueous NaOH solution and the mixture was stirred for 40 minutes at the same temperature. After removal of the water layer, the n-hexane was washed with two 20 ml portions of water and was mixed with 44 ml of a 1N aqueous NaOH solution. The mixture was stirred for 30 minutes at 35°C. The water layer was removed and was heated to 75°C to complete the cleavage reaction. The resulting solution was cooled and acidified to a pH of 5.5. The precipitate was filtered, washed and dried to give 10.7 g of white ω-nitrododecanoic acid (purity 99.8%).

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. In a process for preparing an ω-nitrocarboxylate salt by the nitrooxidation of a cycloalkene, cycloalkadiene or cycloalkatriene in a solution of an inert solvent with nitrogen dioxide and oxygen in the presence of a catalyst, the improvement which comprises: pretreating the nitrooxidation reaction product with an alkaline solution containing from 0.1 to 5 mole % alkali; extracting the resulting α-nitrocycloalkanone, α-nitrocycloalkenone or α-nitrocycloalkadienone with an aqueous alkaline solution of an alkali selected from the group consisting of alkali metal hydroxides, alkali metal carbonates, and ammonia to obtain ω-nitrocarboxylate salt and a salt of said α-nitrocycloalkanone, said nitrocycloalkenone or said α-nitrocycloalkadienone and then cleaving the ring of said salt of said α-nitrocycloalkanone, said α-nitrocycloalkenone or said α-nitrocycloalkadienone to obtain the corresponding ω-nitrocarboxylate salt.

2. The process of claim 1, wherein $C_{6-12}$ nitrocycloalkanones, $C_{6-12}$ nitrocycloalkenones or $C_{6-12}$ nitrocycloalkadienones are extracted from said reaction solution.

3. The process of claim 1, wherein α-nitrocyclododecanone is extracted from said reaction solution.

4. The process of claim 1, wherein said reaction solution from said nitrooxidation is washed with water and an aqueous alkaline solution containing 0.1 to 5 mole % alkali before the extraction of said reaction solution.

5. The process of claim 4, wherein said reaction solution from the nitrooxidation is washed with water to remove the catalyst component and nitric acid, and then is washed with an aqueous alkaline solution at a temperature from 0° to 130°C.

6. The process of claim 1, wherein said extraction is conducted at 0° – 110°C with an aqueous solution containing an alkali in a mole ratio of 1.0 – 3.0 of alkali to α-nitrocycloalkanone, α-nitrocycloalkenone or α-nitrocycloalkadienone.

7. The process of claim 6, wherein the product extracted from said reaction solution is heated at 60° – 110°C.

8. The process of claim 1, wherein said aqueous alkaline solution contains an alkali in a concentration ranging from 0.05 to 3.0N.

* * * * *